US010931879B2

(12) United States Patent
Huschka

(10) Patent No.: US 10,931,879 B2
(45) Date of Patent: Feb. 23, 2021

(54) DEVICE FOR ADJUSTING A CAMERA ANGLE AND USE OF A DEVICE OF THIS TYPE

(71) Applicant: Dr. Ing. h.c. F. Porsche Aktiengesellschaft, Stuttgart (DE)

(72) Inventor: Adrian Huschka, Deizisau (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 12 days.

(21) Appl. No.: 16/387,750

(22) Filed: Apr. 18, 2019

(65) Prior Publication Data
US 2019/0335109 A1 Oct. 31, 2019

(30) Foreign Application Priority Data

Apr. 27, 2018 (DE) ............... 10 2018 110 257.7

(51) Int. Cl.
| *H04N 5/232* | (2006.01) |
| *H04N 5/225* | (2006.01) |
| *B60R 11/04* | (2006.01) |

(52) U.S. Cl.
CPC ......... *H04N 5/23296* (2013.01); *B60R 11/04* (2013.01); *H04N 5/2252* (2013.01)

(58) Field of Classification Search
CPC .. H04N 5/23296; H04N 5/2252; G03B 37/04; G03B 17/561; B60R 11/04; B60R 2011/004; F16M 11/105; F16M 11/18; F16M 11/06
See application file for complete search history.

(56) References Cited

U.S. PATENT DOCUMENTS

| 2,219,169 | A | * | 10/1940 | Newton ............... F16M 11/046 |
| | | | | 248/694 |
| 3,156,196 | A | | 11/1964 | Hood |
| 4,008,372 | A | * | 2/1977 | Ueno .................. H04N 5/2252 |
| | | | | 348/357 |

(Continued)

FOREIGN PATENT DOCUMENTS

| CN | 204187224 | 3/2015 |
| DE | 10 2012 214 326 | 5/2014 |

(Continued)

OTHER PUBLICATIONS

European Search Report dated Sep. 17, 2019.
Chinese Office Action dated Jul. 29, 2020.

*Primary Examiner* — Lin Ye
*Assistant Examiner* — John H Morehead, III
(74) *Attorney, Agent, or Firm* — Gerald E. Hespos; Michael J. Porco; Matthew T. Hespos

(57) ABSTRACT

A device (1) for adjusting a camera angle has a stationary holder (2), a rotary plate (3) mounted pivotably in the holder (2) and an adjusting mechanism (4) for adjusting the position of the rotary plate (3) relative to the holder (2). A camera (8) can be arranged on the rotary plate (3). The adjusting mechanism (4) has an axially fixed adjusting screw (14) and a bushing (15). Rotation of the adjusting screw (14) causes the bushing (15) to carry out a relative movement with respect to the adjusting screw (14). The bushing (15) has a projection (24) that engages in a guide slot (29). The rotary plate (3) moves with respect to the holder (2) as the projection (24) along the guide slot (29).

11 Claims, 4 Drawing Sheets

(56) References Cited

U.S. PATENT DOCUMENTS

| | | | |
|---|---|---|---|
| 5,510,863 A * | 4/1996 | Kliewer | ................. F16M 11/14 396/428 |
| 2003/0001963 A1 | 1/2003 | Masuyama et al. | |
| 2012/0268642 A1 * | 10/2012 | Kawai | .................. G02B 27/646 348/335 |
| 2015/0023655 A1 | 1/2015 | Hoof van | |

FOREIGN PATENT DOCUMENTS

| | | | |
|---|---|---|---|
| DE | 10 2015 119 710 | 5/2017 | |
| DE | 102018110257 B3 * | 4/2019 | ......... H04N 5/23296 |

\* cited by examiner

DEVICE FOR ADJUSTING A CAMERA ANGLE AND USE OF A DEVICE OF THIS TYPE

CROSS REFERENCE TO RELATED APPLICATION

This application claims priority under 35 USC 119 to German Patent Appl. No. 10 2018 110 257.7 filed on Apr. 27, 2018, the entire disclosure of which is incorporated herein by reference.

BACKGROUND

Field of the Invention

The invention relates to a device for adjusting a camera angle.

Related Art

Electronic cameras are used in motor vehicles to detect traffic situations. The electronic cameras are arranged invisibly from the outside in a front radiator grille. A device is used for adjusting a camera angle to ensure unrestricted image acquisition.

DE 10 2012 214 326 A1 discloses a device for adjusting a camera angle. In this regard, the X axis is the longitudinal direction of the vehicle, the Y axis is the transverse direction of the vehicle and the Z axis is the vertical direction of the vehicle. The device disclosed in DE 10 2012 214 326 A1 has a rotary plate that is pivotable about the Z axis in relation to the holder. A horizontal viewing direction of the camera is set via the adjusting means. In detail, the holder has a pin that forms a pivot axis in the direction of the Z axis for the rotary plate. The holder has a rotary mounting on one side for an adjusting screw that is fixed axially therein. The adjusting screw is screwed into a bushing that is attached in an articulated manner in a fork-shaped receptacle to the rotary plate and is clipped to the rotary plate. Rotation of the adjusting screw can cause the rotary plate to pivot in relation to the holder.

DE 10 2015 119 710 A1 describes an apparatus for the fastening of an optical sensor. The apparatus has an adjustment device with an adjusting screw to adjust the inclination of a sensor.

It is an object of the invention to develop a device configured so that a particularly precise adjustment of the camera angle is possible.

SUMMARY

The invention relates to an adjusting device for a camera. The adjusting device has a holder and a rotary plate that rotates with respect to the holder. A guide slot is formed on the holder and engages a projection on the rotary plate so that the projection can move along the guide slot as the rotary plate rotates relative to the holder.

A bushing is threaded on an adjusting screw and travels on account of rotation of the adjusting screw. The adjusting screw is fixed axially and therefore does not lead to a corresponding relative movement between rotary plate and holder, but rather the movement of the bushing is transmitted via the guide slot. Thus, the adjustment of the camera angle can take place substantially more finely, and therefore particularly precise adjustment of the camera angle is possible.

The adjusting screw is mounted in the holder and the guide slot is in the rotary plate. This configuration is structurally compact. In principle, however, the adjusting screw could be mounted in the rotary plate and the guide slot could be in the holder.

The axis of rotation of the adjusting screw may be parallel to the axis of rotation of the rotary plate. This results in particularly simple geometrical ratios and therefore also in a structurally simple configuration. However, the axis of rotation of the adjusting screw could be inclined with respect to the axis of rotation of the rotary plate. This is of advantage if structural specifications of the motor vehicle in the vicinity of the device are to be taken into consideration. If the axis of rotation of the adjusting screw is parallel to the axis of rotation of the rotary plate, the axes of rotation are in the same plane. If the axis of rotation of the adjusting screw is inclined with respect to the axis of rotation of the rotary plate, it is considered advantageous if the angle of inclination is at maximum 40°, preferably 20° to 40°, in particular 30°. The axes of rotation that are not parallel to one another preferably are in the same plane.

The inclination of the guide slot may be linear, and therefore the positioning travel of the bushing is proportional to the pivoting angle of the rotary plate relative to the holder. It is considered advantageous if the guide slot is arranged at an angle of 20° to 30°, in particular 25°, with respect to the axis of rotation of the adjusting screw. This relatively steep arrangement of the guide slot ensures a sufficiently fine adjustment of the camera angle since a relatively large adjustment travel of the bushing is required for a relatively small pivoting angle of the rotary plate with respect to the holder. This is also of advantage from the aspect of unintentional rotation of the rotary plate and holder because of the inclination of the guide slot.

The axis of rotation of the rotary plate may correspond to a lens longitudinal axis of the camera that can be arranged on the rotary plate. Rotation of the adjusting screw therefore causes the camera to pivot about the lens longitudinal axis thereof. The lens longitudinal axis is generally the X axis of the vehicle. By means of the device, the camera angle can be adjusted precisely with respect to a camera image which is rectangular, with a lower and upper boundary in the Y direction and the two lateral boundaries in the Z direction.

The bushing may have two projections on opposite respective sides of the bushing. The one projection engages in a rectilinear guide of the holder and the other projection passes through another rectilinear guide of the holder and engages in the guide slot. Thus, the bushing cannot rotate and guidance in the guide slot is precise.

The device may be in a front region of a motor vehicle. A camera connected to the device is arranged behind an opening on the front side in a front component of the motor vehicle, and the camera angle is adjusted with respect to a lens longitudinal axis of the camera by means of the adjusting screw that is accessible from the front side or the rear side of the front component. Said front component may be a radiator grille of the motor vehicle. The particular use therefore relates to the adjustment of the camera angle with respect to the lens longitudinal axis of the camera.

Further features of the invention emerge from the attached drawing and the description of the exemplary embodiments reproduced in the drawing, without being restricted thereto.

DETAILED DESCRIPTION

Figure 1:
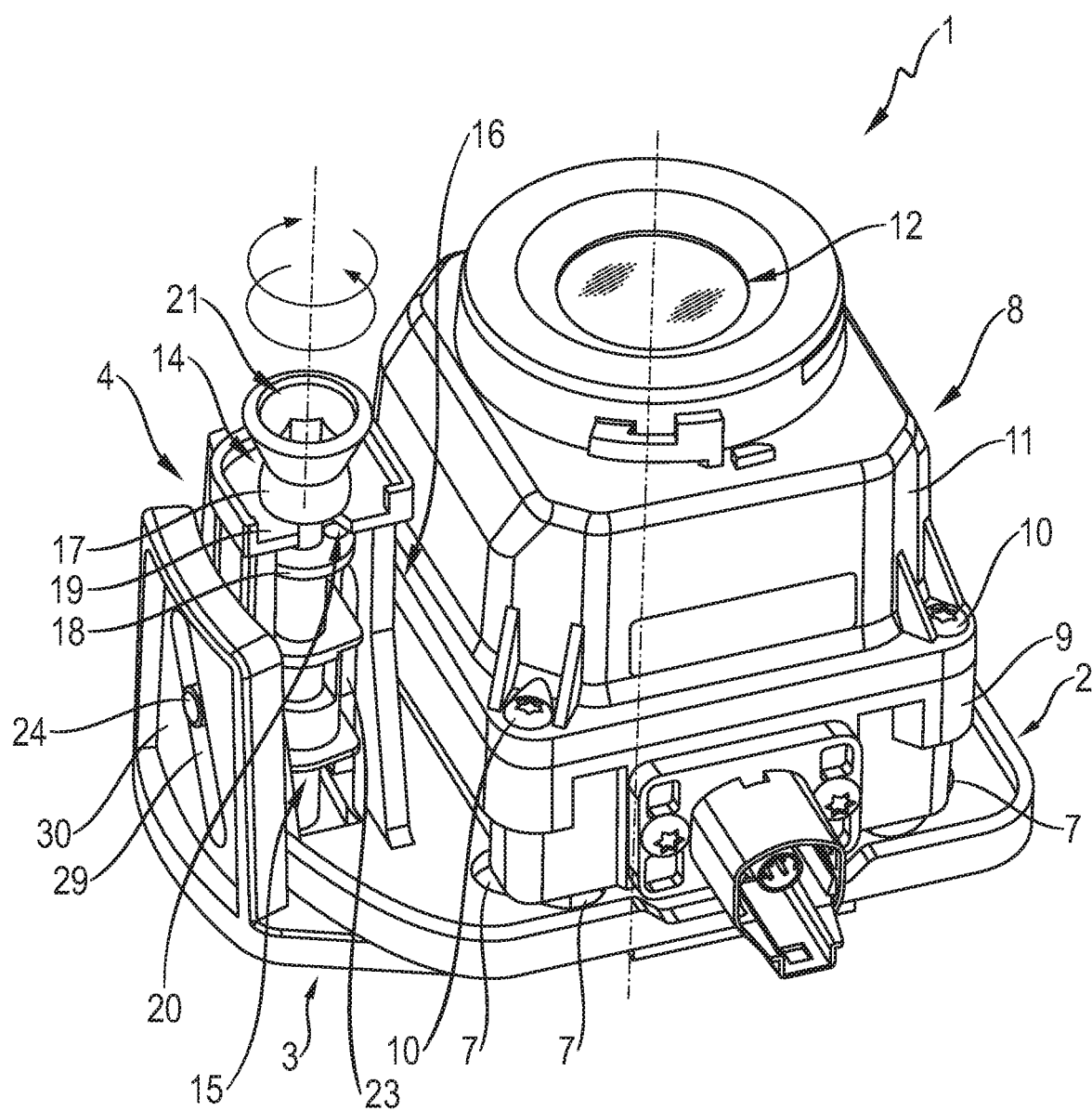
FIG. 1 shows a first exemplary embodiment of the device in a three-dimensional illustration, illustrated with a camera.
Figure 2:
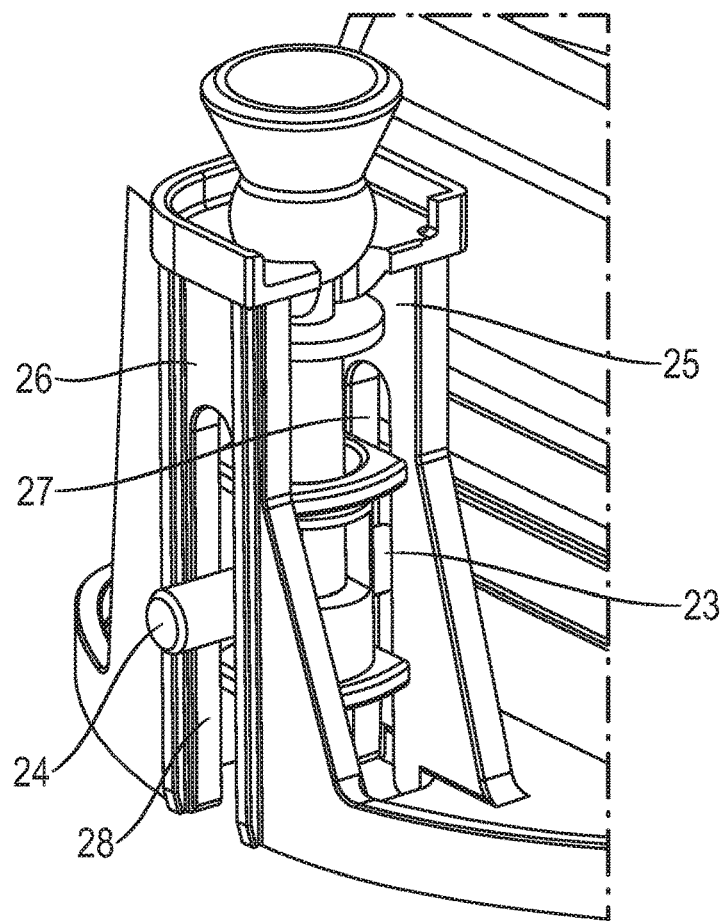
FIG. 2 is a perspective view of a detail of the arrangement of FIG. 1 in the region of a stationary holder and an adjusting means.

FIGS. 1 to 7 illustrate a first embodiment of a device 1 for adjusting a camera angle. The device 1 has a stationary holder 2, a rotary plate 3 mounted pivotably in the holder 2 and an adjusting means 4 for adjusting the position of the rotary plate 3 relative to the holder 2.

The rotary plate 3 has a circular central passage opening 5 that receives an extension 6 of the holder 2 to form an axis of rotation of the rotary plate 3 with respect to the holder 2. The device 1 is used in a passenger vehicle that has a vehicle longitudinal direction X, a vehicle transverse direction Y and a vehicle vertical direction Z. The axis of rotation runs in the X direction. The holder 2 has four elongate holes 7 concentric with respect to the central passage opening 5. A camera 8 is fastened to the rotary plate 3. The camera 8 has a camera housing 9, a housing cover 11 connected to the camera housing 9 via screws 10, and a lens 12 arranged in the region of an opening of the housing cover 11. A longitudinal axis of the lens 12 corresponds to the axis of rotation of the rotary plate 3 in the holder 2. The lens longitudinal axis therefore is arranged in the X direction.

The camera housing 9 is screwed to the rotary plate 3 by four screws 13 that pass here through the holes 7 in the holder 2. Since the camera 8 is connected to the rotary plate 3, the camera 8 can rotate together with the rotary plate 3. The camera 8 can slide in the region of the camera housing 9 on the immovable holder 2.

The rotary plate 3 can be pivoted with respect to the stationary holder 2 by means of the adjusting means 4. The adjusting means 4 has an axially fixed adjusting screw 14 and a guide bushing 15. Rotation of the adjusting screw 14 causes the bushing 15 to carry out a relative movement with respect to the adjusting screw 14.

The holder 2 has a bearing extension 16, and a head region of the adjusting screw 14 has two bead-like radial projections 17, 18. The bearing extension 16 has a bearing plate 19 with a latching groove 20 that engages the adjusting screw 14 between the bead-like projections 17, 18. Thus, the adjusting screw 14 is mounted in the bearing extension 16 in an axially fixed manner and is held in the Y and Z direction in the bearing plate 19. However, the adjusting screw 14 is rotatable with respect to the bearing plate 19 about an axis of rotation that runs in the X direction. An end of the adjusting screw 7 that is averted from the rotary plate 3 has a receptacle 21 with a hexagon socket so that a tool can rotate the adjusting screw 14.

The adjusting screw 14 has a thread 22 extending from the projection 18 to the end averted from the receptacle 21. The threaded region of the adjusting screw 14 is screwed in into the bushing 15. The bushing 15 has a short cylindrical projection 23 and a long cylindrical projection 24 arranged coaxially in the Y axis direction. The bearing extension 16 has two parallel limbs 25, 26 that have elongated holes 27, 28 extending parallel to the X direction. The projections 23 and 24 are guided in the respective elongated holes 27, 28. The long projection 24 protrudes over the elongated hole 28 and engages in a guide slot 29 formed in a bearing extension 30 of the rotary plate 3. The guide slot 29 is arranged in the holder 2 in a curved plane concentrically with respect to the axis of rotation of the rotary plate 3. The profile of the guide slot 29 is linear, with this being understood as meaning that the linear adjustment of the bushing 15 leads to a proportional rotation of the rotary plate 3 with respect to the holder 2 because of the guide slot 29. The guide slot 29 is arranged at an angle of 20° to 30°, in particular of 25°, with respect to the axis of rotation of the adjusting screw 14.

Figure 3:
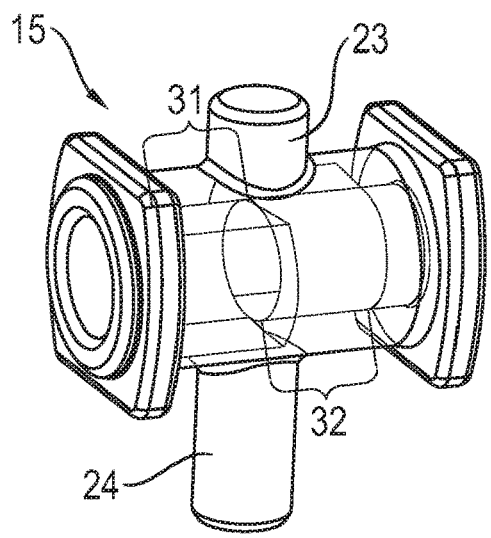
FIG. 3 is a perspective view of a bushing forming part of the adjusting means, with the arrangement rotated by 90° in relation to the use position.
Figure 4:
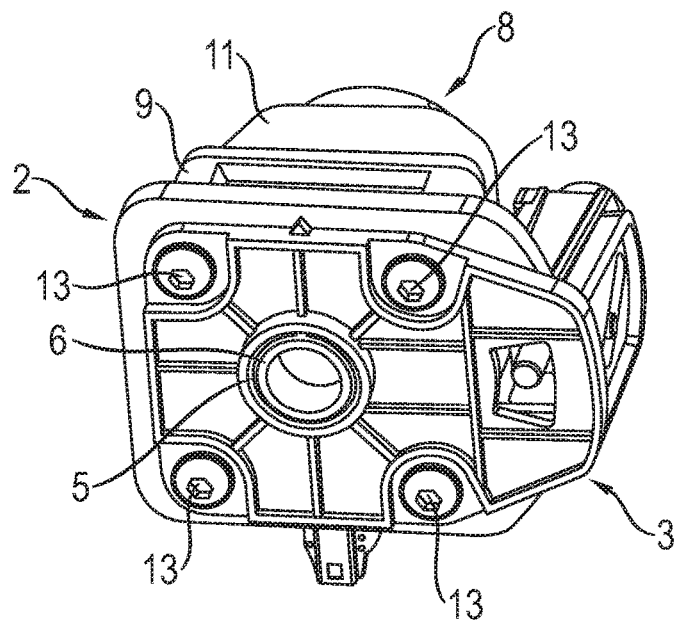
FIG. 4 is a bottom perspective view of the arrangement of FIG. 1.

The bushing 15 has two threads 31 and 32, as shown in FIG. 3. The thread lead of the thread 32 is offset from the thread lead of the thread 31. The clamping force which arises to prevent the bushing 15 from moving by itself on the adjusting screw 14.

Figures 5, 6, 7:
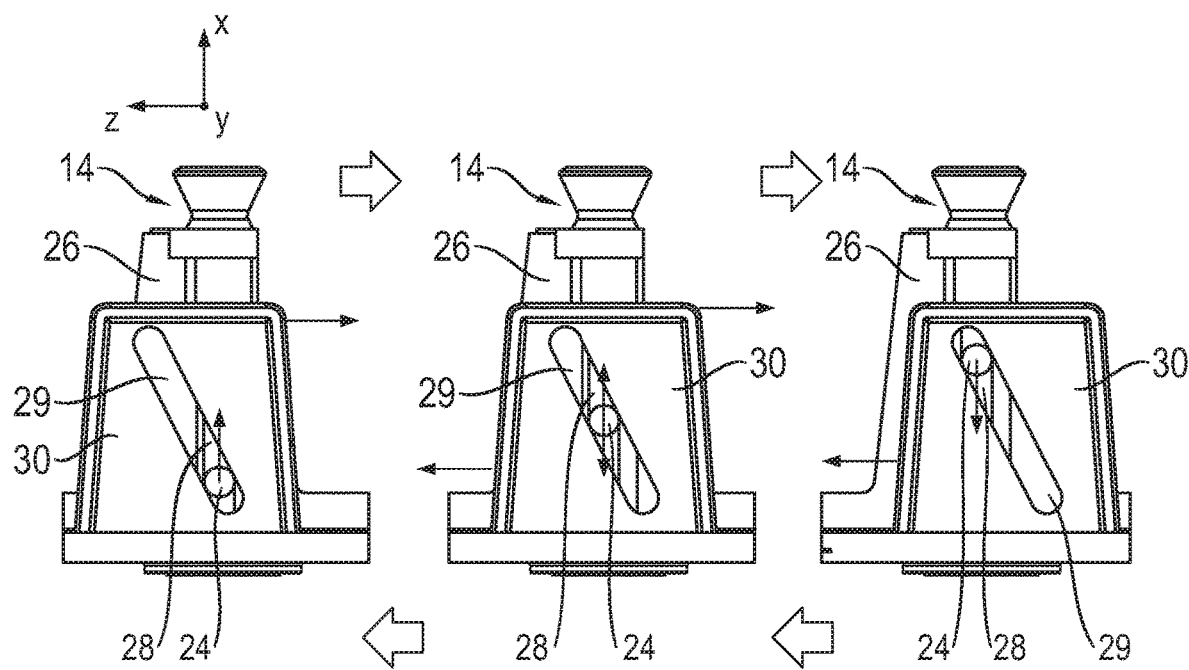
FIG. 5 is a side view of the device in a final rotational position of the rotary plate.
FIG. 6 is a side view of the device in a central rotation of the rotary plate.
FIG. 7 is a side view of the device in another final position of the rotary plate.

FIGS. 5 to 7 show three different rotational positions of the rotary plate 3 and therefore of the camera 8 with respect to the holder 2. The camera 8 is not also illustrated in these figures. FIG. 5 shows the bushing 15 substantially at the bottom and in a position where the rotary plate 3 is in a first extreme rotational position with respect to the holder 2. FIG. 6, the bushing 15 halfway up, and therefore in a position where the rotary plate 3 is in a central rotational position with respect to the holder 2. FIG. 7 shows the bushing 15 is in its upper final position, and therefore in a position where the rotary plate 9 is in the opposite extreme rotational position with respect to the holder 2. The camera 8 is pivoted about the X axis in accordance with the rotational positions of the rotary plate 3.

Figure 8:
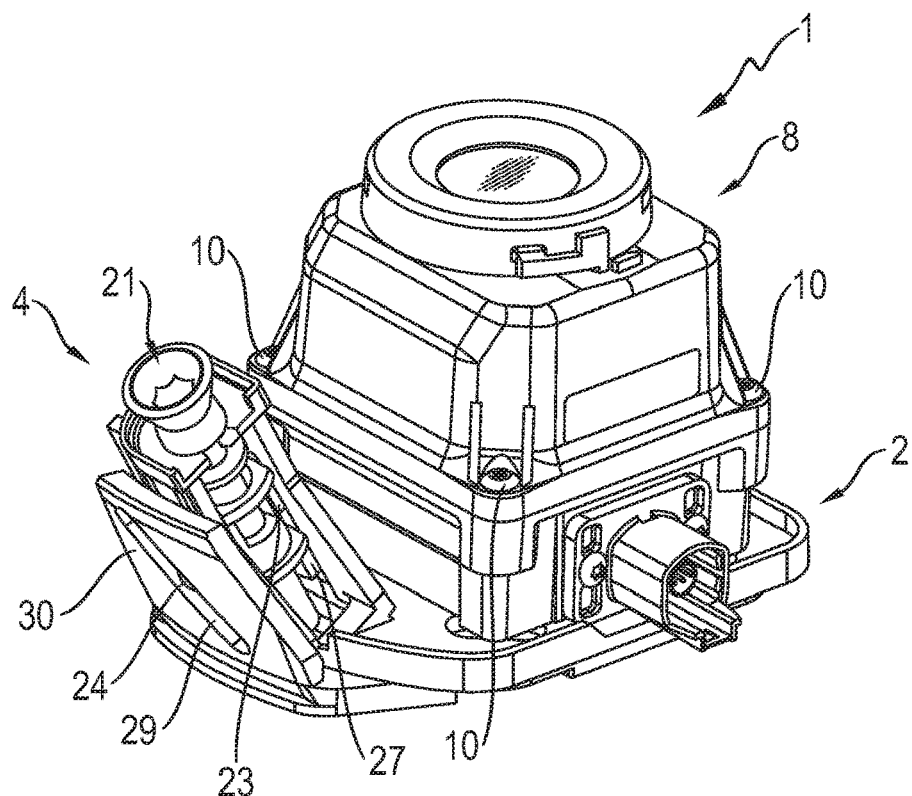
FIG. 8 is a perspective view of a second exemplary embodiment of the device, illustrated with a camera.
Figure 9:
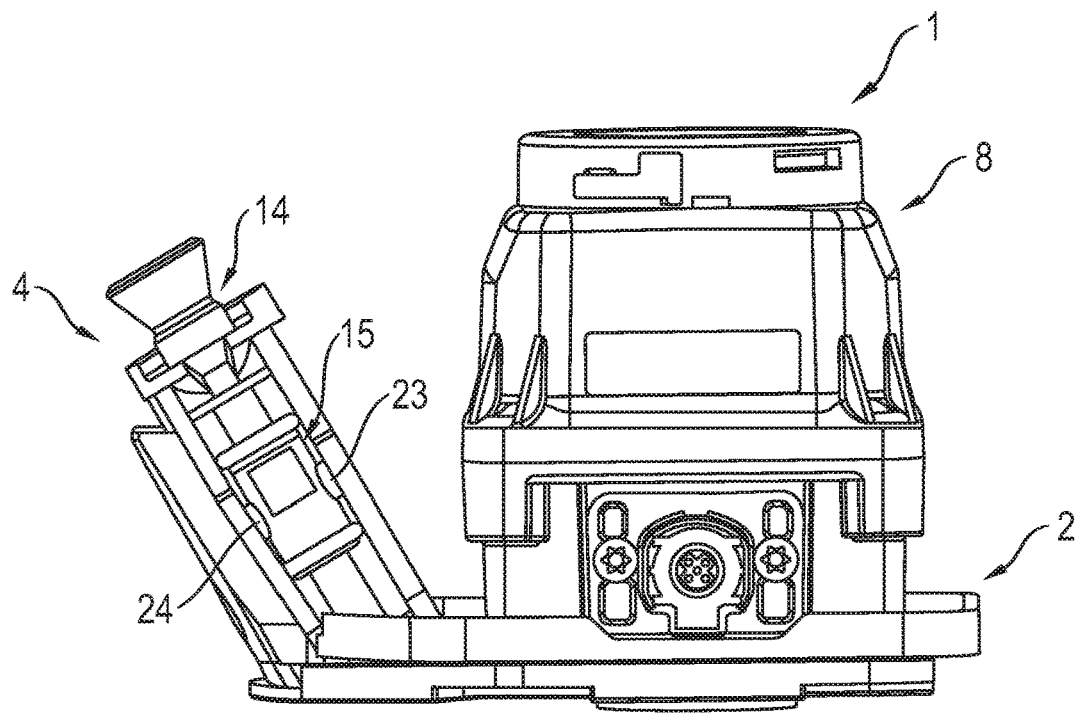
FIG. 9 is a side view of the device of FIG. 8.

The second embodiment is illustrated in FIGS. 8 and 9 differs from the first embodiment only in that the adjusting screw 14 is not arranged in the X direction but rather is arranged inclined with respect to the X direction. The axis of rotation of the adjusting screw 14 therefore is inclined with respect to the axis of rotation of the rotary plate 3. The angle of inclination here is at maximum 40°, preferably 20° to 40°, in particular 30°. The bearing extension 16 that receives the adjusting screw 14 and the bushing 15, and also the bearing extension 30 with the guide slot 29 are inclined in accordance with this inclination of the adjusting screw 14. Reference is otherwise made to the description of the first embodiment.

LIST OF REFERENCE SIGNS

1 Device
2 Holder
3 Rotary plate
4 Adjusting means
5 Passage opening
6 Extension
7 Hole
8 Camera
9 Camera housing
10 Screw
11 Housing cover
12 Lens
13 Screw
14 Adjusting screw 15 Bushing
16 Bearing extension
17 Projection
18 Projection
19 Bearing plate
20 Latching groove
21 Receptacle
22 Thread
23 Projection
24 Projection
25 Limb
26 Limb
27 Elongated hole
28 Elongated hole
29 Guide slot
30 Bearing extension
31 Thread
32 Thread

What is claimed is:

1. A device for adjusting a camera angle, the device comprising: a stationary holder, a rotary plate mounted pivotably to the stationary holder and an adjusting means for pivoting adjustment of a position of the rotary plate relative to the holder, the adjusting means has an adjusting screw fixed axially relative to the holder and a bushing threadedly engaged with the adjusting screw so that rotation of the adjusting screw about an axis of rotation of the adjusting screw causes the bushing to carry out a relative movement along the axis of the adjusting screw, the bushing having a projection that engages in guide slot in a bearing extension of the rotary plate, wherein movement of the projection along the guide slot generates relative movement of the rotary plate with respect to the holder.

2. The device of claim 1, wherein the axis of rotation of the adjusting screw is parallel to an axis of rotation of the rotary plate.

3. The device of claim 1, wherein axes of rotation of adjusting screw and rotary plate are inclined with respect to each other and are in a common plane.

4. The device of claim 3, wherein an angle of inclination of the adjusting screw to the axis of rotation of the rotary plate is at maximum 40°.

5. The device of claim 1, wherein the axis of rotation of the rotary plate corresponds to a lens longitudinal axis of the camera that can be arranged on the rotary plate.

6. The device of claim 1 further comprising a camera connected to the rotary plate, and the camera angle is adjusted with respect to a lens longitudinal axis of the camera by rotating the adjusting screw.

7. The device of claim 1, wherein the bearing extension of the rotary plate is parallel to a pivoting axis of the rotary plate relative to the stationary holder.

8. The device of claim 1, wherein the bearing extension of the rotary plate is concentric with a pivoting axis of the rotary plate relative to the stationary holder.

9. A device for adjusting a camera angle, the device comprising: a stationary holder, a rotary plate mounted pivotably to the stationary holder and an adjusting means for pivoting adjustment of a position of the rotary plate relative to the holder, the adjusting means has an axially fixed adjusting screw and a bushing, wherein rotation of the adjusting screw causes the bushing to carry out a relative movement with respect to the adjusting screw, wherein the bushing has a projection that engages in a receptacle, the receptacle being a guide slot in which the projection engages, wherein, movement of the projection along the guide slot generates relative movement of the rotary plate with respect to the holder, and wherein the guide slot is linear and is at an angle of 20° to 30° with respect to an axis of rotation of the adjusting screw.

10. The device of claim 9, wherein the adjusting screw is mounted in the holder and the guide slot is arranged in the rotary plate.

11. A device for adjusting a camera angle, the device comprising: a stationary holder, a rotary plate mounted pivotably to the stationary holder and an adjusting means for pivoting adjustment of a position of the rotary plate relative to the holder, the adjusting means has an axially fixed adjusting screw and a bushing, wherein rotation of the adjusting screw causes the bushing to carry out a relative movement with respect to the adjusting screw, wherein the bushing has a projection that engages in a receptacle, the receptacle being a guide slot in which the projection engages, wherein, movement of the projection along the guide slot generates relative movement of the rotary plate with respect to the holder, and wherein the bushing has first and second projections arranged respectively on averted first and second sides of the bushing, wherein the first projection engages in a rectilinear guide of the holder and the second projection passes through another rectilinear guide of the holder and engages in the guide slot.

* * * * *